United States Patent
Deroche

(10) Patent No.: US 10,711,589 B2
(45) Date of Patent: Jul. 14, 2020

(54) SAND SEPARATOR

(71) Applicant: Timothy Deroche, Houma, LA (US)

(72) Inventor: Timothy Deroche, Houma, LA (US)

(73) Assignee: A.S.A.P. Industries Manufacturing, Inc., Houma, LA (US)

(*) Notice: Subject to any disclaimer, the term of this patent is extended or adjusted under 35 U.S.C. 154(b) by 76 days.

(21) Appl. No.: 16/058,672

(22) Filed: Aug. 8, 2018

(65) Prior Publication Data

US 2020/0048998 A1    Feb. 13, 2020

(51) Int. Cl.
| | |
|---|---|
| *E21B 43/34* | (2006.01) |
| *B01D 45/12* | (2006.01) |
| *B04C 5/12* | (2006.01) |
| *B04C 5/085* | (2006.01) |
| *B04C 5/103* | (2006.01) |
| *B04C 5/14* | (2006.01) |

(52) U.S. Cl.
CPC .............. *E21B 43/34* (2013.01); *B01D 45/12* (2013.01); *B04C 5/085* (2013.01); *B04C 5/103* (2013.01); *B04C 5/12* (2013.01); *B04C 5/14* (2013.01)

(58) Field of Classification Search
CPC .......... B04C 5/12; B04C 5/103; B04C 5/085; B04C 5/10; B04C 5/181; B04C 5/16; B04C 2009/004; B04C 5/14
See application file for complete search history.

(56) References Cited

U.S. PATENT DOCUMENTS

| | | | |
|---|---|---|---|
| 769,808 A * | 9/1904 | Venderbush et al. .. | B01D 45/12 |
| | | | 55/459.1 |
| 4,187,088 A | 2/1980 | Hodgson | |
| 5,368,735 A | 11/1994 | Ford | |
| 6,019,825 A | 2/2000 | Greene et al. | |
| 6,221,134 B1 * | 4/2001 | Conrad .................. | A47L 9/1608 |
| | | | 55/426 |
| 6,251,296 B1 | 6/2001 | Conrad et al. | |
| 6,419,719 B2 | 7/2002 | Conrad et al. | |
| 6,589,306 B2 | 7/2003 | Ronning et al. | |
| 6,698,521 B2 | 3/2004 | Schrenkel et al. | |
| 7,476,295 B2 | 1/2009 | Annesley et al. | |

(Continued)

FOREIGN PATENT DOCUMENTS

EP     0090335 A2 *    10/1983 .............. F22B 37/32

OTHER PUBLICATIONS

English language machine translation of EP 0090335 A2. (Year: 2019).*

(Continued)

*Primary Examiner* — David C Mellon

(74) *Attorney, Agent, or Firm* — Raymond G. Areaux; J. Matthew Miller, III; Carver, Darden, Koretzky, Tessier, Finn, Blossman & Areaux, LLC

(57) ABSTRACT

Described herein is an apparatus for separating sand or particulate matter from a hydrocarbon production stream, with the apparatus having a cylindrical upper portion forming an upper cavity and a cylindrical lower portion forming a lower cavity, with the upper cavity and lower cavity divided by a separator plate having a plurality of sand collection channels. As described herein, a production stream flows into the upper cavity, through the collection channels, where flow of the production stream is altered, depositing sand in the lower cavity, after which separated gas leaves the apparatus.

9 Claims, 7 Drawing Sheets

(56) References Cited

U.S. PATENT DOCUMENTS

| | | | |
|---|---|---|---|
| 7,909,092 B2 | 3/2011 | Cobb | |
| 8,051,907 B2 | 11/2011 | Cobb et al. | |
| 8,945,399 B2 | 2/2015 | Howard | |
| 9,045,979 B2 | 6/2015 | Cobb et al. | |
| 9,616,431 B2 | 4/2017 | Lyon et al. | |
| 2014/0243571 A1* | 8/2014 | Lyon | B04C 5/04 |
| | | | 585/800 |

OTHER PUBLICATIONS

Sand Separators; Cameron; Retrieved on Jun. 20, 2018 from https://www.slb.com/services/completions/stimulation/cameron-fracturing-services-equipment/flowback-and-well-testing/flowback-and-well-test-equipment/sand-separators.aspx.

Four Phase; Making Light Work of Sand Removal; Retrieved on Jun. 20, 2018 from http://www.fourphase.com/sand-removal/.

Spherical Sand Trap; Retrieved on Jun. 20, 2018 from https://www.nov.com/Segments/Completion_and_Production_Solutions/Intervention_and_Stimulation_Equipment/Aftermarket/Surface_Well_Test/Spherical_Sand_Trap.aspx.

Drawing No. BASS-001-ASSY-C, dated Nov. 3, 2015.
Drawing No. GCSS-001, Dated Nov. 22, 2013.
Drawing No. MS-004-ASSY, Dated Nov. 12, 2008.
Drawing No. SGS-A8-001, Dated Apr. 13, 2010.
Drawing No. SSA11-001-ASSY, Dated Dec. 3, 2010.
Drawing No. SSA13-001-ASSY, Dated Dec. 28, 2010.
Drawing No. SSA19-001-ASSY-C, Dated Apr. 30, 2011.
Drawing No. SSA19-003-ASSY, Dated Dec. 6, 2012.
Drawing No. SW10K-001-ASSY-C, Dated Jan. 25, 2018.
Drawing No. SW10K-001-ASSY-FLOW, Dated Feb. 6, 2016.
Drawing No. TSS-004-ASSY, Dated Apr. 19, 2012.
Gulfpro-001, Dated Apr. 17, 2010.
Drawing No. SWII-001-01, Dated Sep. 16, 2015.

\* cited by examiner

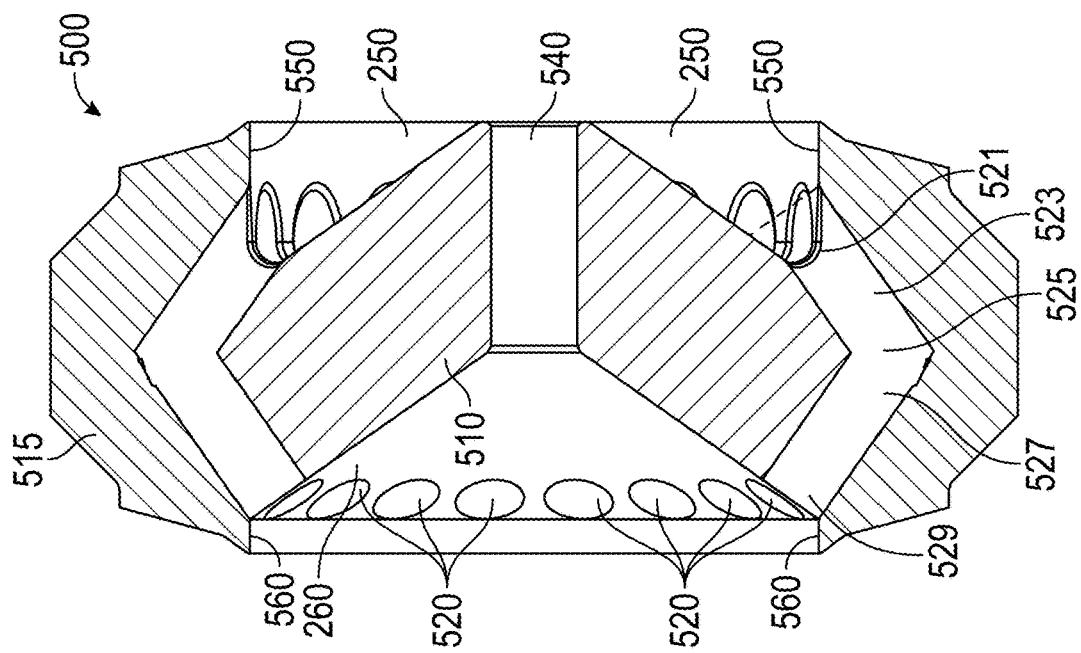
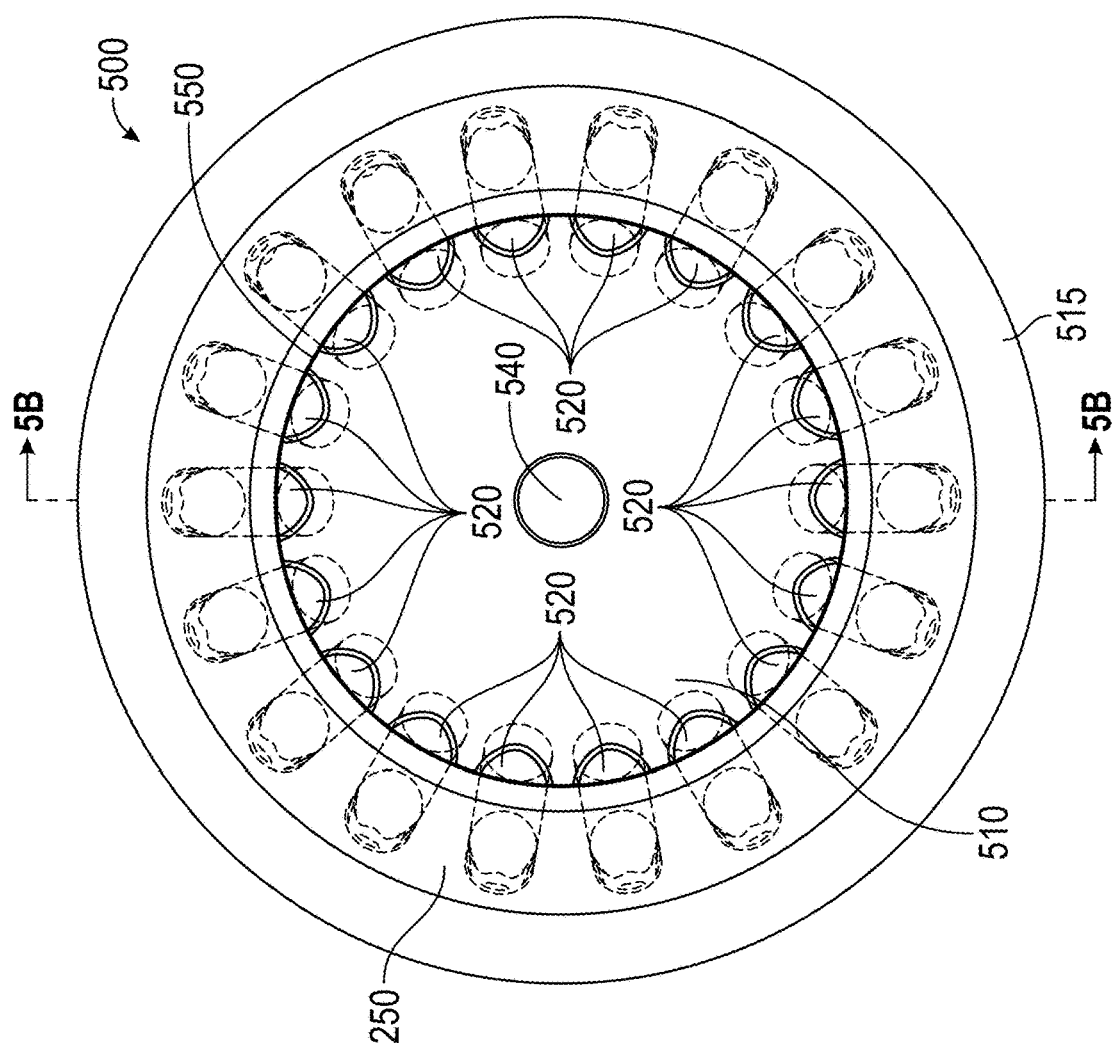

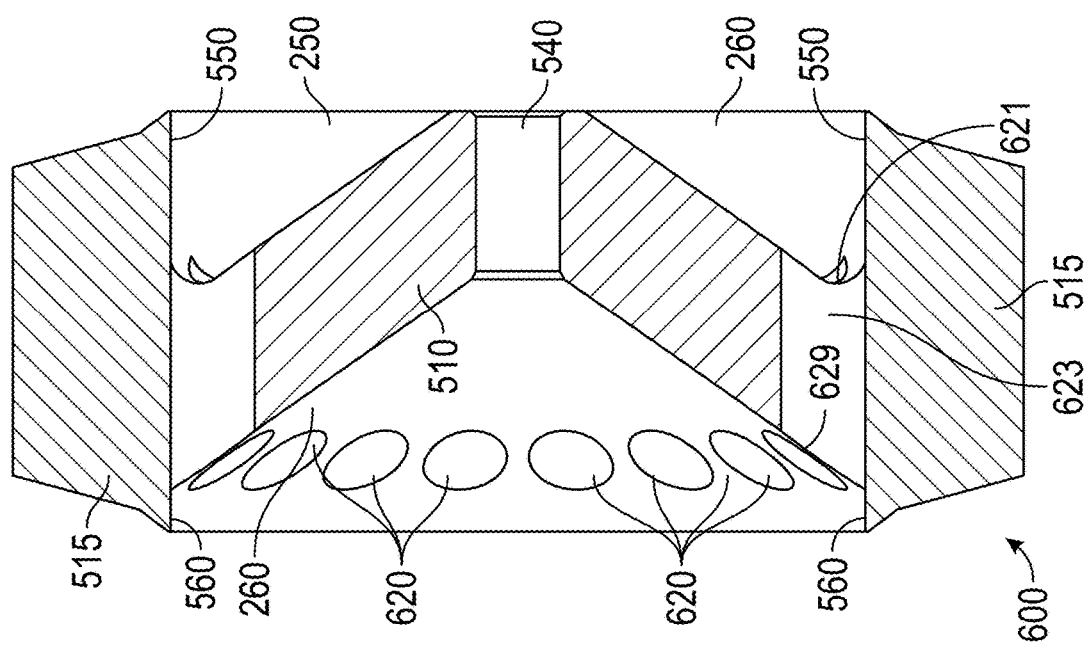
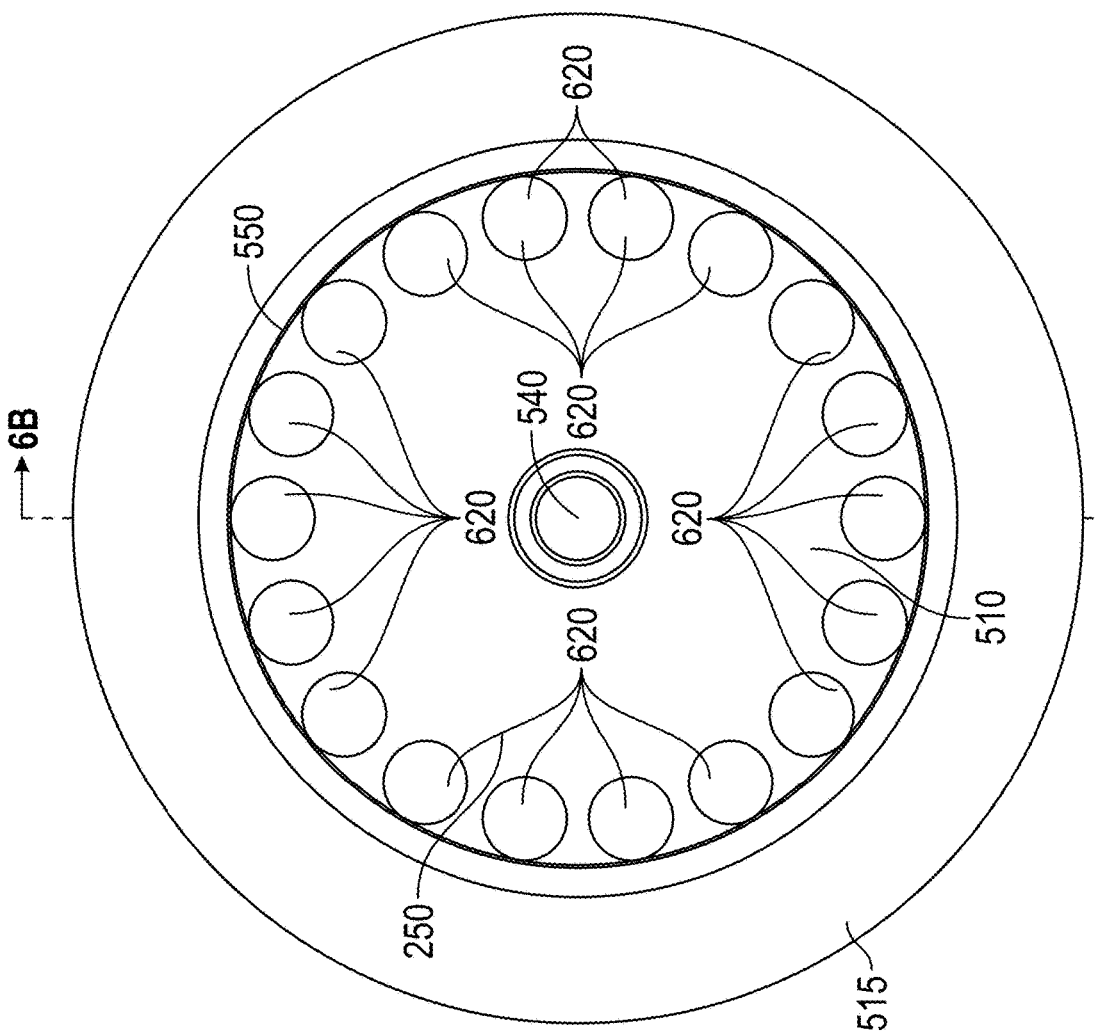

SAND SEPARATOR

FIELD OF THE INVENTION

Disclosed herein is an apparatus for separating sand from a natural gas and oil production stream during well operation. More specifically, the present disclosure teaches a device that accepts a stream of fluid containing hydrocarbons and particulate matter such as sand, directs the flow of hydrocarbons and particulate matter interior to the device, separates and collects the particulate matter in a lower chamber, and outputs a stream of hydrocarbons without the collected particulate matter.

BACKGROUND OF THE INVENTION

Natural gas is a naturally occurring hydrocarbon gas mixture consisting primarily of methane, other hydrocarbons, and impurities. When extracted, natural gas may be accompanied by water, hydrocarbons having various properties, carbon dioxide, or debris from drilling a well. Natural gas is generally found in deep underground rock formations. One of the ways to extract natural gas from these rock formations includes horizontal drilling and hydraulic fracturing, or "fracing." Hydraulic fracturing involves pumping fluid and sand under pressure through a wellbore into a rock formation. Pressure is then removed, leaving sand in the rock formation and allowing natural gas to escape through the wellbore, where the natural gas can be captured and used. However, as natural gas escapes from the rock formation, some of the sand or other particulate matter flows with natural gas through the wellbore to the surface. This sand or particulate matter can cause problems, including wear and tear or plugging of production equipment or pipelines.

Devices commonly known as "sand separators" are used to separate this sand or particulate matter from natural gas. Sand separators usually are comprised of a container capable of holding gas or fluid under high pressure with an inlet port for accepting natural gas directly or indirectly from the wellbore, an area where sand or particulate matter is deposited, and an outlet port where natural gas exits from the sand separator. However, known sand separators do not remove all sand or particulate matter. As a result, there has been a need for an improved sand separator that allows for more efficient and reliable separation of sand or particulate matter from natural gas.

SUMMARY OF THE INVENTION

In accordance with the invention, disclosed herein is an apparatus for separating particulate matter from a hydrocarbon production stream, said apparatus comprising: an upper cylindrical body having an upper end and a first wall, a lower cylindrical body having a lower end and a second wall, a hydrocarbon inlet pipe extending through said first wall, a hydrocarbon outlet port on said upper end, a collection port on said lower end, and a separator plate, wherein a bottom of said upper cylindrical body is connected to said separator plate forming an upper cavity inside said upper cylindrical body, and a top of said lower cylindrical body is connected to said separator plate forming a lower cavity inside said lower cylindrical body, wherein said separator plate has a plurality of collection channels providing a fluid connection between said upper cavity and said lower cavity and an outlet channel providing a fluid connection between said upper cavity and said lower cavity; and wherein said outlet channel is located at a center of said separator plate.

BRIEF DESCRIPTION OF THE DRAWINGS

FIG. 5 illustrates a top view of a separator plate, and a side view of a cross section, as indicated by arrows 5B on FIG. 5A, of a separator plate.

FIG. 6 illustrates a top view of an alternate separator plate, and a side view of a cross section, as indicated by arrows 6B on FIG. 6A, of an alternate separator plate.

Figure 1:
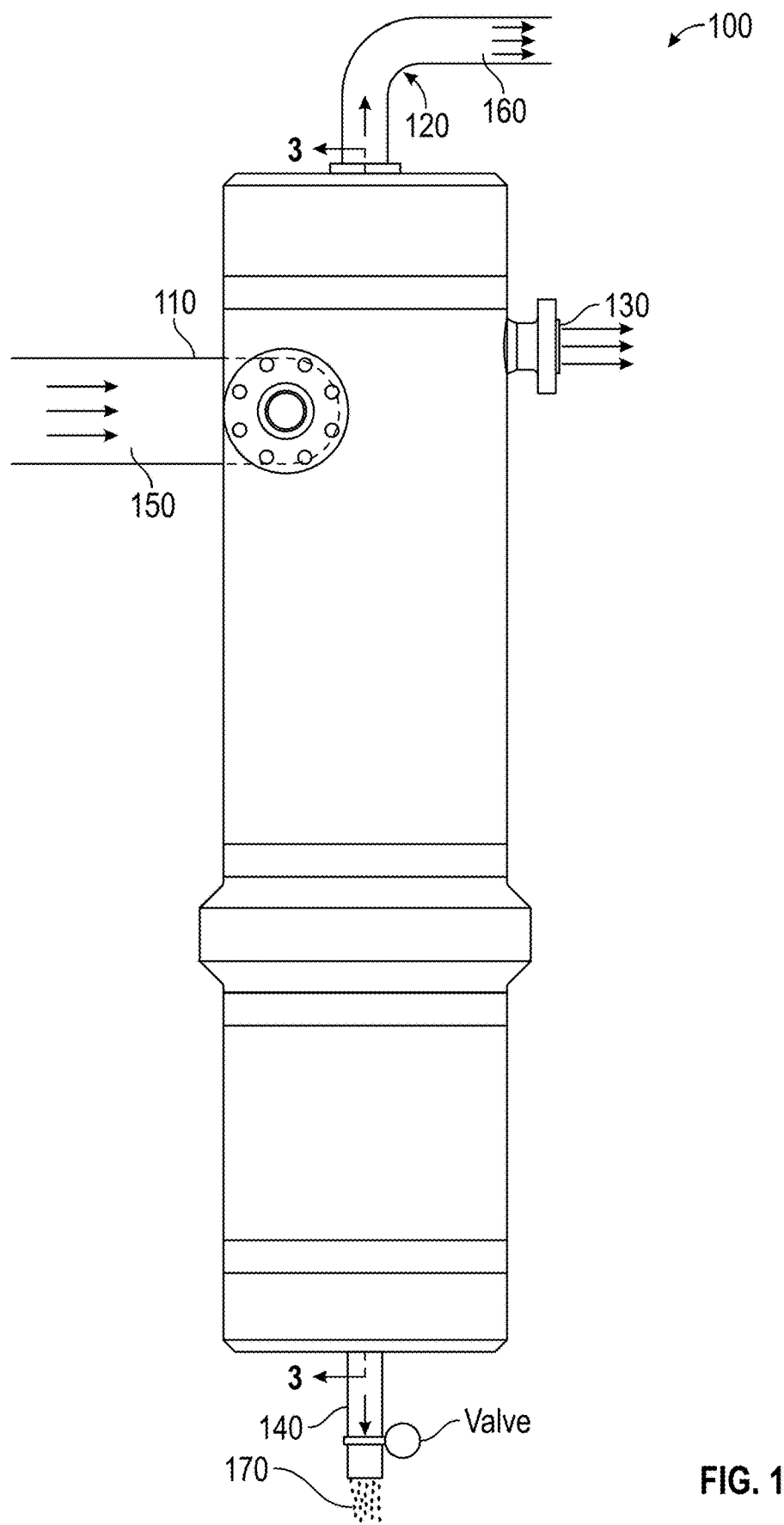
FIG. 1 illustrates a side view of an exterior of an improved sand separator.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

The appended drawings illustrate exemplary configurations of the invention and, as such, should not be considered as limiting the scope of the invention that may admit to other equally effective configurations. It is contemplated that features of one configuration may be beneficially incorporated in other configurations without further recitation.

DETAILED DESCRIPTION OF THE INVENTION

Turning now to the figures, FIG. 1 depicts an exterior view of sand separator 100. Sand separator 100 comprises inlet port 110, outlet port 120, overpressure port 130, and sand port 140. FIG. 1 depicts production stream 150 entering inlet port 110, separated gas 160 exiting outlet port 120, and sand 170 exiting sand port 140.

Production stream 150 comprises gas and/or liquid hydrocarbons under pressure, where such pressure causes a flow of production stream 150 into sand separator 100. Production stream may be of a varying pressure, and sand separator 100 may be built to withstand pressures of 5,000 psi, 10,000 psi, 15,000 psi, or otherwise, with the differences in design being components of different thicknesses and welds being performed differently. Overpressure port 130 is configured accept an overpressure valve, which has the capability of releasing a portion of production stream 150, thereby lowering the pressure of production stream 150 to a pressure below the designed maximum pressure of sand separator 100.

Sand 170 is the sand or other particulate matter separated from production stream 150 by sand separator 100 and collected at the bottom of sand separator 100. Sand 170 is not under a constant flow. Rather, sand separator 100 separates and collects sand 170 for removal at predetermined regular or irregular intervals. For example, in one embodiment, sand 170 may be removed through sand port 140 by opening a valve connected to the exterior of sand port 140.

Separated gas 160 is what remains from production stream 150 after sand 160 has been separated and may include both gas and liquids.

Inlet port 110, outlet port 120, overpressure port 130, and sand port 140 all comprise flanges designed to American Petroleum Institute (API) standards, and the specific sizes used may vary in accordance with the requirements of the hydrocarbon production system into which sand separator 100 is intended to be installed.

In one embodiment, sand separator 100 is approximately a cylinder having a height of approximately 100 inches and an outer diameter of approximately 24 inches, with inlet port 110, outlet port 120, and sand port 140 having openings of approximately 3 1/16 inches diameter, and with overpressure port 130 having an opening of approximately 2 1/16" diameter.

Figure 2:
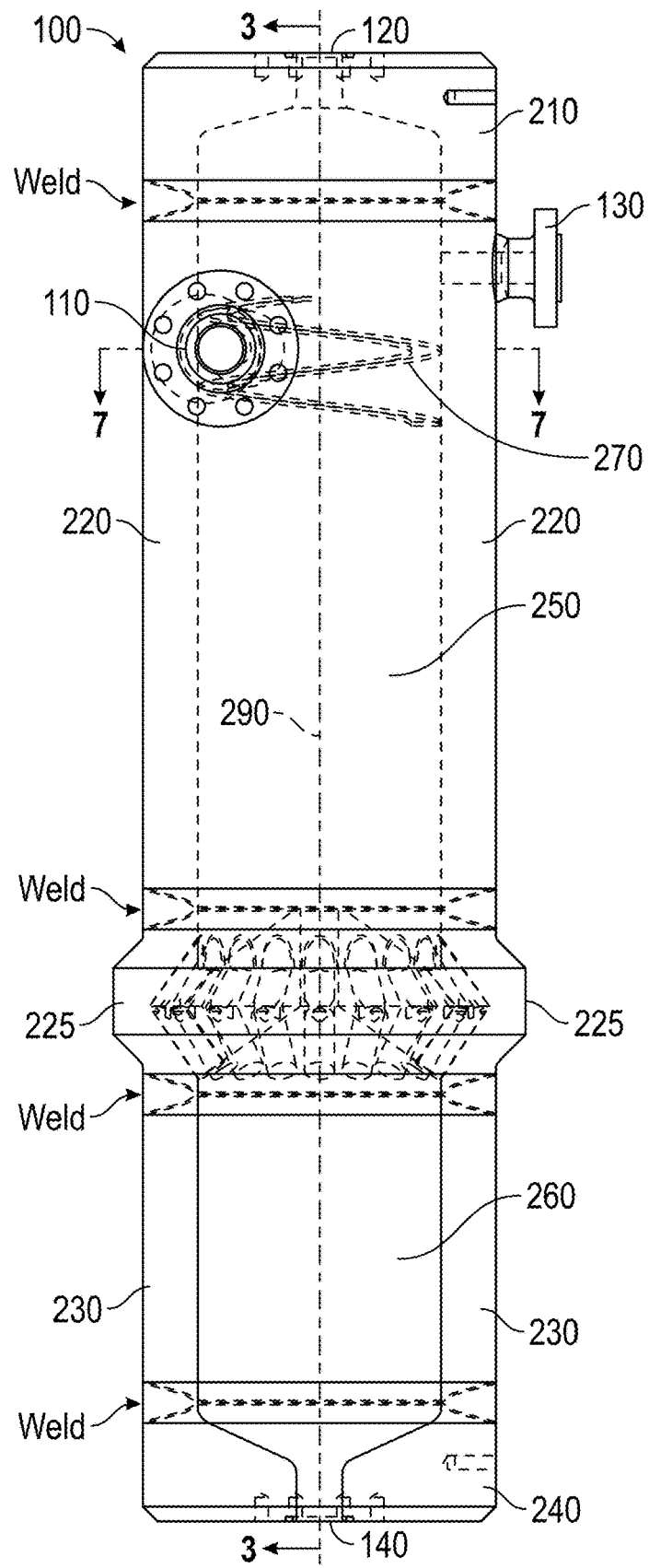
FIG. 2 illustrates a side view of an exterior of an improved sand separator, with interior components shown in dashed lines.
Figure 3:
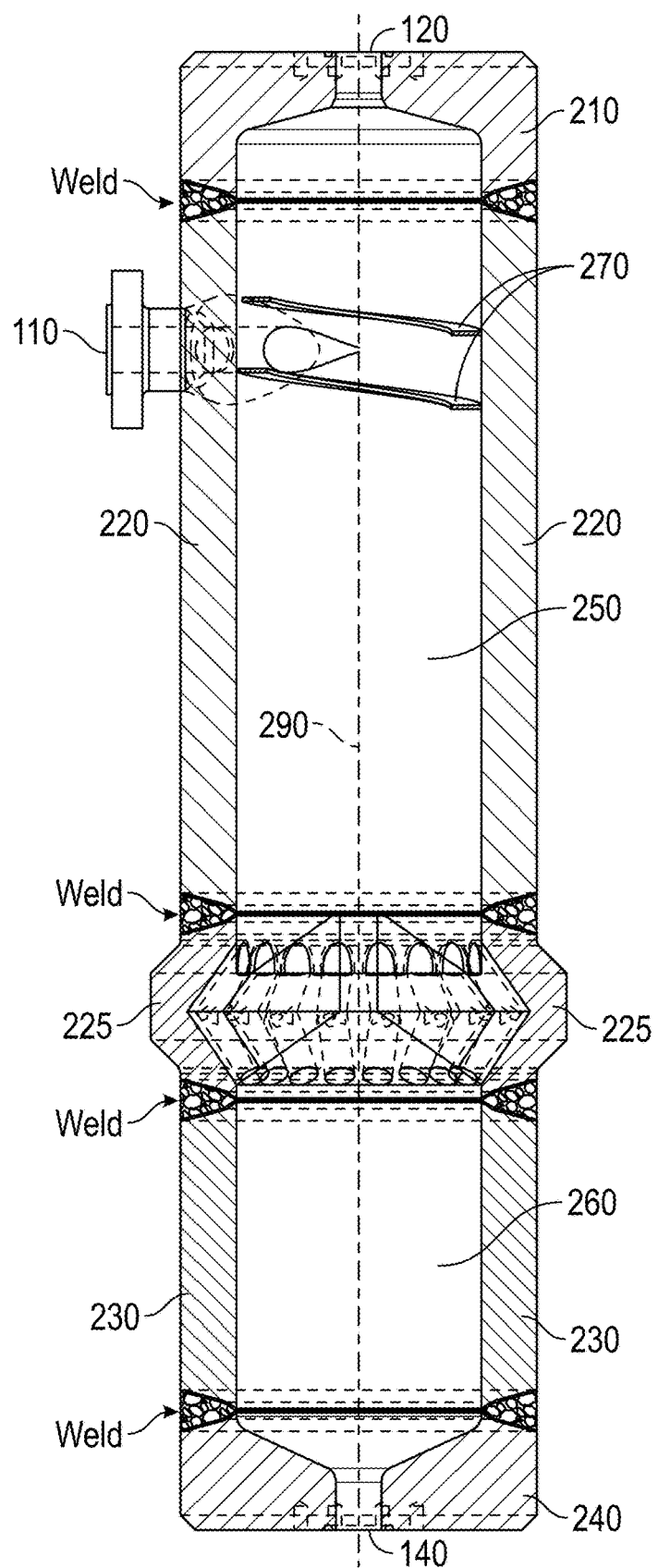
FIG. 3 illustrates a side view of a cross section, as indicated by arrows 3 on FIGS. 1 and 2, of an improved sand separator.

FIGS. 2 and 3 depict the interior of sand separator 100 through differing views. In addition to showing elements depicted in FIG. 1, FIGS. 2 and 3 also depict cap 210, upper wall 220, separator plate 225, lower wall 230, basin 240, upper cavity 250, and lower cavity 260. As shown, upper wall 220 further comprises baffle 270. Baffle 270 is optional. Separator plate 225 may be angled separator plate 500 (depicted in FIGS. 5A and 5B), straight separator plate 600 (depicted in FIGS. 6A and 6B), or otherwise. FIGS. 2 and 3 also depict central vertical axis 290, which is an axis of orientation of sand separator 100 and is depicted for reference.

Cap 210, upper wall 220, and separator plate 225 form the upper, side, and lower edges, respectively, and therefore define the boundary, of upper cavity 250. Upper cavity 250 is a void that fills with production stream 150 when sand separator 100 is in use. Upper cavity 250 is smooth, specifically, the inner and outer diameter of upper wall 220 is the same as the portion of cap 210 where upper wall 220 and cap 210 meet. However, cap 210 becomes thicker towards its corners so as to, and as necessary to, withstand pressure.

Separator plate 225, lower wall 230, and basin 240 form the side, upper, and lower edges, respectively, and therefore define the boundary, of lower cavity 260. Lower cavity 260 is a void that fills with hydrocarbons and sand 170 when sand separator 100 is in use. Lower cavity 260 is smooth, specifically, the inner and outer diameter of lower wall 230 is the same as the portion of basin 240 where lower wall 230 and basin 240 meet. However, basin 240 becomes thicker towards its corners so as to, and as necessary to, withstand pressure.

Separator plate 225 is located between upper wall 220 and lower wall 230 and forms a permeable barrier separating upper cavity 250 and lower cavity 260. There are varying embodiments of separator plate 225, discussed in reference to FIGS. 5A, 5B, 6A, and 6B. In one embodiment, the distance between the top of separator plate 225 and the top of cap 210 is 58 inches, the distance between the bottom of separator plate 225 and the bottom of basin 240 is 28.88 inches, and separator plate 225 is 12.5 inches tall and has a maximum outer diameter of 28 inches. Other distances may be used. However, I speculate that upper cavity 250 must be tall enough to allow adequate flow of production stream 150 and that if upper cavity 250 is too short, sand separator 100 will not work.

Baffle 270 extends in a corkscrew, or threaded, fashion about the circumference of upper wall 220, starting above inlet port 110 and extending along upper wall 220 below inlet port 110. In one embodiment, baffle 270 extends once around the circumference of upper wall 220 above inlet port 110 and once around the circumference of upper wall 220 below inlet port 110. In one embodiment, baffle 270 is approximately between about 1 and 2 inches in width (i.e., the distance baffle 270 extends inward from upper wall 220 into upper cavity 250). I speculate that baffle 270 must be large enough to direct flow of production stream 150 but not so large as to block flow of separated gas 160 flowing up from lower cavity 260 into outlet port 120.

When in use, production stream 150 flows into inlet port 110. Inlet port 110 is located such that the flow of production stream 150 is at a tangent to the circle formed by upper wall 220. Accordingly, when production stream 150 flows into inlet port 110, I speculate that production stream 150 flows around the circumference of upper wall 220, thereby creating a vortex. Gravity and optional baffle 270 direct the vortex flow of production stream 150 downward until production stream 150 hits separator plate 225. As production stream 150 flows across separator plate 225, production stream 150 flows into one or more holes in separator plate 225.

While production stream 150 is in motion, sand 170 contained in production stream 150 is carried by the flow of production stream 150. I speculate that some of production stream 150 will flow about the outermost portion of upper cavity 250, along upper wall 220, and that some of production stream 150 will flow about the interior portions of upper cavity 250, such flows in a vortex circling around the central vertical axis 290 of sand separator 100. I speculate that more sand 170 is carried by faster-moving portions of production stream 150, faster-moving portions of production stream 150 will flow along upper wall 220, and therefore more sand 170 will be carried by production stream 150 near upper wall 220. I speculate that more sand will be collected by separator plate 225 if holes in separator plate 225 are located towards the perimeter of separator plate 225 and upper wall 220.

After flowing into one or more holes in separator plate 225, production stream 150 flows through separator plate 225 into lower cavity 260. At this point, the flow of production stream 150 slows, and sand 170 is no longer carried by flow of production stream 150. Thus, sand 170 is deposited into basin 240, and separated gas 160 flows upward through a central hole in separator plate 225, through upper cavity 250 to outlet port 120. I speculate that, as separated gas 160 flows through upper cavity 250, some separated gas 160 mixes with production stream 150, but that much of separated gas 160 continues to flow upward and into outlet port 120.

In one embodiment, when constructing sand separator 100, cap 210, upper wall 220, separator plate 225, lower wall 230, and basin 240 are machined separately, and then welded together, as depicted. In one embodiment, these components are comprised of 4130 stainless steel, designated 75k material and suitable for use with hydrogen sulfide (H2S). However, other suitable materials may also be used, including, without limitation, Grade 350 LF2.

In one embodiment, upper wall 220 and lower wall 230 form an outer diameter of 24 inches and an inner diameter of 16½ inches, thereby having a thickness of 3¾ inches.

Figure 4:
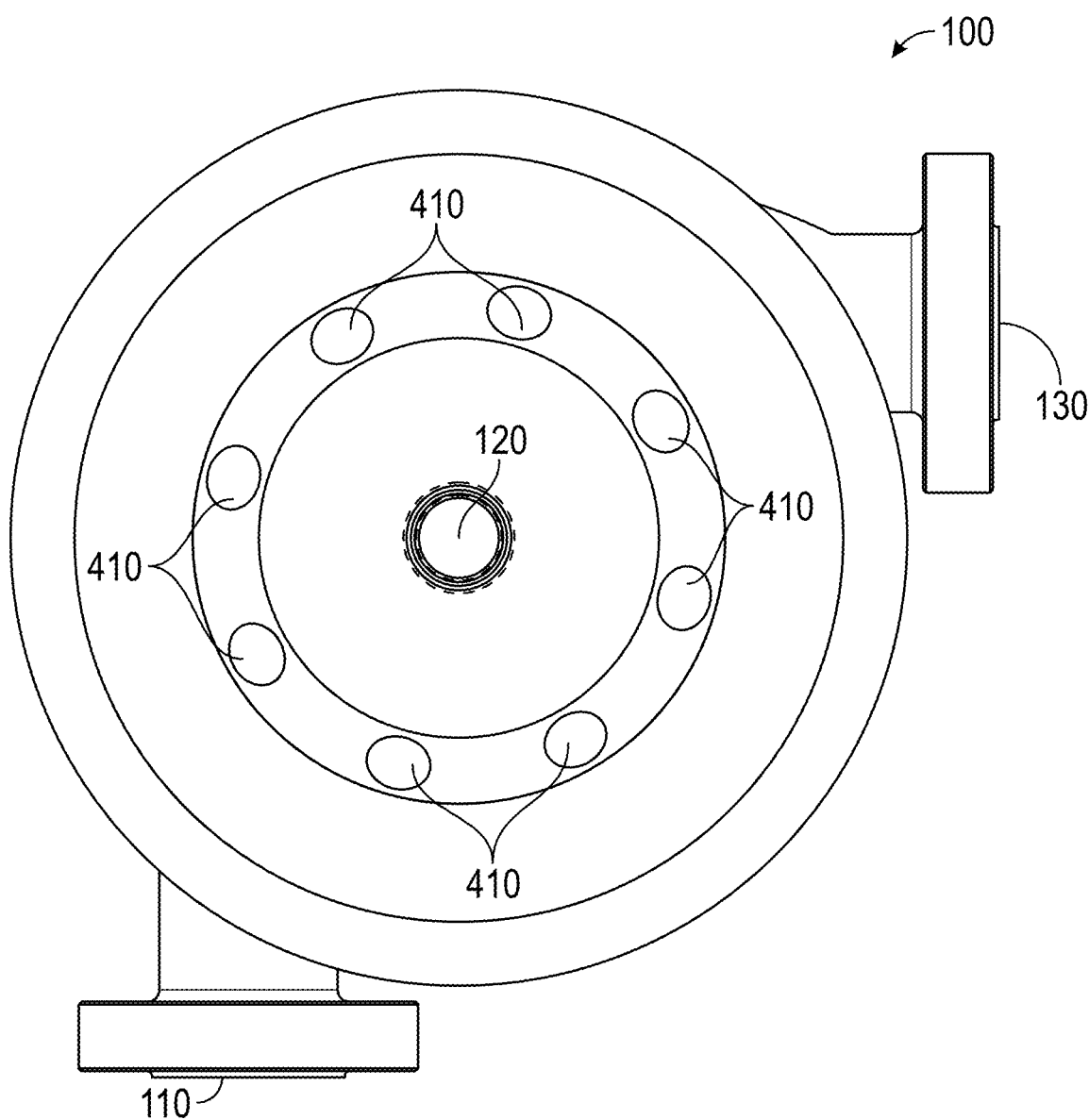
FIG. 4 illustrates a top view of an improved sand separator.

FIG. 4 depicts a top view of sand separator 100, showing inlet port 110, outlet port 120, and overpressure port 130. FIG. 4 also depicts a plurality of bolt holes 410 for securing flanges to outlet port 120. A plurality of the same type of bolt holes are also on the bottom of sand separator 100 (not shown), for securing flanges to sand port 140.

FIGS. 5A and 5B depict a top view, and a side view of a cross section of angled separator plate 500. Angled separator plate 500 comprises central wall 510, outer wall 515, a plurality of collection channels 520, outlet channel 540, upper outer wall face 550, and lower outer wall face 560.

When installed in sand separator 100, central wall 510 forms a convex conical bottom boundary of upper cavity 250 and a concave conical top boundary of lower cavity 260. Other shapes may be used to direct flow of production stream 150 inside sand separator 100.

The inner diameter of outer wall 515 is the same as the inner diameter of upper wall 220 at upper outer wall face 550, and the inner diameter of outer wall 515 is the same as the inner diameter of lower wall 230 at lower outer wall face 560. Thus, upper cavity 250 is flush at the connection between upper wall 220 and angled separator plate 500; and lower cavity 260 is flush at the connection between lower wall 230 and angled separator plate 500.

The outer diameter of outer wall 515 extends beyond the outer diameter of upper wall 220 and lower wall 230. Outer wall 515 creates a barrier between the plurality of collection channels 520 and the exterior of sand separator 100. Central wall 510 creates a barrier between upper cavity 250 and lower cavity 260. In cross section, central wall 510 extends from one side of outer wall 515 across the interior of angled separator plate 500 to the other wide of outer wall 515. In other words, outer wall 515 ends, and central wall 510 begins, at upper outer wall face 550 and lower outer wall face 560, and central wall 510 fills the interior of angled separator plate 500, except for the plurality of collection channels 520 and outlet channel 540.

In one embodiment, the outer diameter of outer wall 515 extends to 28 inches.

The plurality of collection channels 520 provide a fluid connection between upper cavity 250 and lower cavity 260. Each collection channel 520 has an upper opening 521, an upper passage 523, a channel corner 525, a lower passage 527, and a lower opening 529. Upper opening 521 is fluidly connected to upper passage 523. Upper passage 523 is fluidly connected to channel corner 525. Channel corner 525 is fluidly connected to lower passage 527. Lower passage 527 is fluidly connected to lower opening 529. Upper passage 523, channel corner 525, and lower passage 527 form an angle, such that upper passage 523 extends outward from opening 521, away from central vertical axis 290 (central vertical axis 290 is depicted in FIGS. 2 and 3), with upper passage 523 reaching beyond the inner diameter of upper wall 220; and lower passage 527 extends inward from channel corner 525, towards central vertical axis 290.

In the depicted embodiment of FIGS. 2-7, central vertical axis 290 extends through the center of outlet port 120, sand port 140, upper cavity 250, lower cavity 260, and separator plate 225 (as well as angled separator plate 500, straight separator plate 600, and outlet channel 540). Therefore outlet port 120, sand port 140, upper cavity 250, lower cavity 260, and separator plate 225 (as well as angled separator plate 500, straight separator plate 600, and outlet channel 540) are coaxial.

In one embodiment, the angle formed by upper passage 523, channel corner 525, and lower passage 527 is a 110 degree angle.

In one embodiment, there are eighteen equally-spaced collection channels 520, each collection channel 520 is approximately 2 inches in diameter, the distance between upper opening 521 and the outermost portion of upper passage 523 (i.e., at the outermost portion of channel corner 525) is 5.6 inches.

In one embodiment, the top surface of central wall 510 and the bottom surface of central wall 510 are parallel-in-cross-section, and the top and bottom of central wall 510 both have slopes of 35 degrees. In other words, the thickness of central wall 510 is the same throughout. However, other embodiments may have a central wall 510 of varying thickness In some embodiments, upper opening 521 is machined partially into upper outer wall face 550 and partially into central wall 510.

Outlet channel 540 provides a fluid connection between lower cavity 260 and upper cavity 250.

I speculate that the production stream 150 travels through the plurality of collection channels 520, after which movement of production stream 150 slows, depositing sand 170 in lower cavity 260, and separated gas 160 then travels upward through outlet channel 540. I also speculate that the vortex flow of production stream 150 pushes production stream 150 outward, away from central vertical axis 290, and that this causes production stream 150 to be pushed outwardly into the plurality of collection channels 520, after which production stream continues to flow downward into lower cavity 260. In other words, I speculate that, because the collection channels 520 extend beyond the inner diameter of upper wall 220, the vortex flow of production stream 150 in upper cavity 250 causes production stream 150 (including sand 170) to be pushed outwardly into the collection channels 520, thereby causing more of production stream 150 to move downwardly into lower cavity 260 rather than be pushed back upward into upper cavity 250 (and perhaps exiting sand separator 100 through outlet port 120 with separated gas 160). I further speculate that the portion of production stream 150 pushed into the collection channels 520 will contain more sand 170 because of the placement of collection channels 520 near upper wall 220.

FIGS. 6A and 6B depict straight separator plate 600. Straight separator plate 600 is the same as angled separator plate 500, except that, instead of having a plurality of collection channels 520, straight separator plate 600 has a plurality of straight collection channels 620. Straight collection channels 620 each have an upper passage opening 621, a passageway 623, and a lower passage opening 629. Passageway 623 is a straight passage through central wall 510 that is parallel to central vertical axis 290.

In one embodiment, straight separator plate 600 has eighteen straight collection channels 620.

Figure 7:
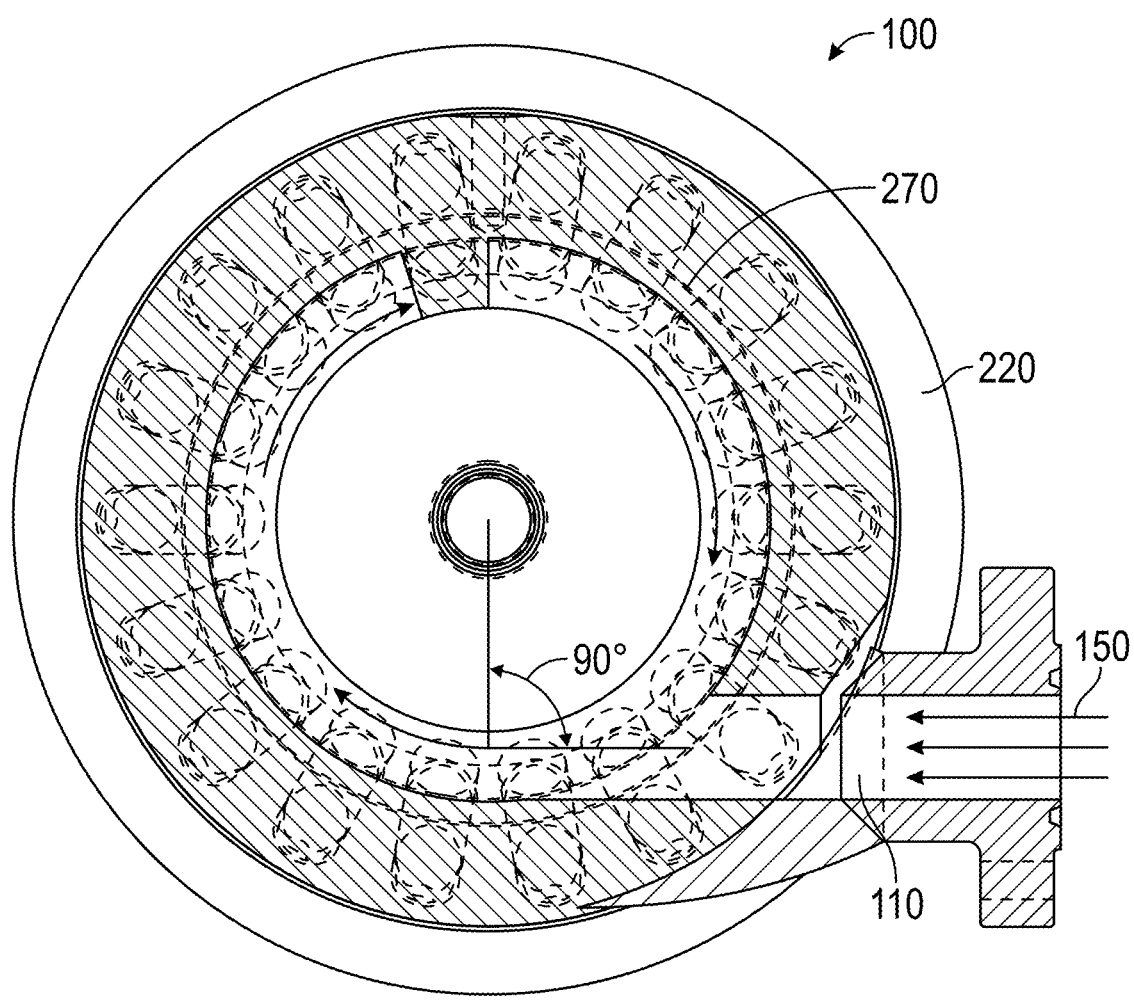
FIG. 7 illustrates a top view of a cross section, as indicated by arrows 7 on FIG. 2, of an improved sand separator.

FIG. 7 depicts a cross-section view of production stream 150 entering sand separator and passing across baffle 270. As shown, when production stream 150 enters upper cavity 250, production stream 150 is flowing at a tangent to the circle defined by a horizontal cross section of upper wall 220. As production stream 150 flows into upper cavity 250, production stream 150 hits upper wall 220, which alters the direction of production stream 150, causing production stream 150 to flow circularly in a vortex around upper cavity 250. Additionally, as production stream 150 flows into upper cavity 250, baffle 270 directs the circular vortex flow of production stream 150 downward toward separator plate 225.

The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof as permitted as a matter of law.

That which is claimed is:

1. An apparatus for separating particulate matter from a hydrocarbon production stream, said apparatus comprising:
    an upper cylindrical body having an upper end and a first wall, a lower cylindrical body having a lower end and a second wall, a hydrocarbon inlet pipe extending through said first wall, a hydrocarbon outlet port on said upper end, a collection port on said lower end, and a separator plate,
    wherein a bottom of said upper cylindrical body is connected to said separator plate forming an upper cavity inside said upper cylindrical body, and a top of said lower cylindrical body is connected to said separator plate forming a lower cavity inside said lower cylindrical body,
    wherein said separator plate has a plurality of collection channels providing a fluid connection between said upper cavity and said lower cavity and an outlet channel providing a fluid connection between said upper cavity and said lower cavity,
    wherein said outlet channel is located at a center of said separator plate,
    wherein each of said plurality of collection channels comprises an upper opening located immediately adjacent to said first wall of said upper cylindrical body; and
    wherein each of said plurality of collection channels further comprises an upper passage, a corner, a lower passage, and a lower opening; said upper opening is fluidly connected to said upper passage, said upper passage is fluidly connected to said corner, said corner is fluidly connected to said lower passage, and said lower passage is fluidly connected to said lower opening; and
    said first wall of said upper cylindrical body has an inner diameter, and said upper passage extends from said upper opening outwardly beyond said inner diameter of said first wall to said corner.

2. The apparatus of claim 1, wherein said upper passage extends away from a central axis of said apparatus at an angle of approximately 35 degrees.

3. The apparatus of claim 2, wherein said hydrocarbon inlet pipe is at a tangent to said upper cylindrical body.

4. The apparatus of claim 3, wherein said upper cylindrical body further comprises a baffle along a circumference of an interior of said first wall, capable of directing flow of hydrocarbons entering said hydrocarbon inlet pipe both along said circumference of said first wall and towards said separator plate.

5. The apparatus of claim 4, wherein said separator plate comprises a central wall having a top and a bottom, wherein said top of said central wall is conical and said bottom of said central wall is conical.

6. The apparatus of claim 5, wherein said separator plate forms a bottom boundary of said upper cavity, and said bottom boundary is convex.

7. The apparatus of claim 6, wherein said separator plate forms a top boundary of said lower cavity, and said top boundary is concave.

8. The apparatus of claim 5, wherein said separator plate forms a top boundary of said lower cavity, and said top boundary is concave.

9. The apparatus of claim 2, wherein said lower passage extends towards said central axis and said upper passage and said lower passage form an angle of approximately 110 degrees at said corner.

* * * * *